United States Patent [19]

Akiyama

[11] 4,091,538
[45] May 30, 1978

[54] MOWING APPARATUS

[75] Inventor: Satoshi Akiyama, Odawara, Japan

[73] Assignee: Kabushiki Kaisha Shikutani, Odawara, Japan

[21] Appl. No.: 783,288

[22] Filed: Mar. 31, 1977

[30] Foreign Application Priority Data

July 21, 1976 Japan .................................. 51-86955

[51] Int. Cl.² .............................................. A01G 3/06
[52] U.S. Cl. ......................................... 30/276; 56/12.7
[58] Field of Search ..................... 30/276, 347; 56/12.7, 56/295

[56] References Cited

U.S. PATENT DOCUMENTS

| 3,826,068 | 7/1974 | Ballas et al. | 56/12.7 |
| 4,020,552 | 5/1977 | Mizuno et al. | 30/276 |

*Primary Examiner*—Jimmy C. Peters
*Attorney, Agent, or Firm*—Birch, Stewart, Kolasch & Birch

[57] ABSTRACT

An apparatus is equipped with a non-metallic thick string of a diameter greater than 0.10 inches for cutting wild vegetation in the forest. The string is endwisely wedged into an acute slot formed in a top spool-like casing and directly wound about the cylindrical portion of the casing. The initial portion of the string with a somewhat large bent is received within the hollow portion in the cylindrical portion without disturbing the orderly coiling of the string about the casing. The coiled string is protected by a bottom cover which is detachably mounted on the casing and locked for rotation therewith. The free end of the coiled string extends outwardly from the cover through one of guide ports provided in the peripheral wall of the cover, in order to form a cutting flail with an effective working length. The cover is elastically arranged to disengage from locking engagement with the casing for rotation relative thereto, so that the string may easily payed out as the working flail become shortened through wear.

8 Claims, 4 Drawing Figures

MOWING APPARATUS

BACKGROUND AND SUMMARY OF THE INVENTION

The present invention relates to a cutter assembly for mowing apparatus, as well as a mowing apparatus incorporaing such a cutter assembly. In particular, the invention relates to a rotary cutter assembly suitable to use a relatively thick and strong non-metallic string as a cutting flail.

Mowing apparatus are known in which a rotary assembly is provided with a coiled non-metallic string the free end of which serves as a cutting flail when the assembly is rotated. The effective working length of the flail can be lengthened from time to time when the assembly is stationary, to compensate for shortening of the working length during use. Nylon monofilament strings, which are almost completely incapable of causing any significant injury to persons or animals struck by the flailing cutting string, are often used as they can serve as effective and safe cutters. Such strings are particularly suitable for cutting or trimming along fences, walls and the trunks or stems of trees.

Typical known forms of such mowing apparatus have a rotary head member arranged to be rotated by a gasoline engine or an electric motor, the head having one or more spools detachable from or integral with the rotary head member. A length of flexible, non-metallic line is coiled about each spool and its free end swings arcuately upon actuation of the engine or motor to cut vegetation, in the manner of a flail. The initial end of a string is knotted or angularly turned at an aperture in the spool to make a tight connection therewith. However, this leads to such a disadvantage that thick and strong strings of a diameter greater than 0.10 inches (2.5 mm) can not be used due to being too strong to be knotted or angularly turned. Such strings, when turned at an aperture, make a bent with a somewhat large radius to prevent themself from orderly coiling about the spool. Strings of a diameter less than 0.10 inches (2.5 mm) are compact and less power-consumptive but not always efficient to cut heavy wild weeds. It is a fact that mowers with a dangerous metal cutter prevail in agricultural and forestal works. Therefore, there is a demand for mowing apparatus provided with a safe and strong non-metallic string capable of cutting wild weeds in the forest.

It an object of the present invention to provide an improved mowing apparatus adaptable to use a strong cutting line having a diameter greater than 0.10 inches (2.5 mm).

It is another object of the invention to provide an improved mowing apparatus having a rotary casing in the form of a spool on which a relatively thick and sufficiently long line is immediately coiled.

It is still a further object of the invention to provide an improved mowing apparatus simple in construction and easy in use.

According to the present invention, there is provided a cutter assembly for a mowing machine having a power-driven shaft, which assembly comprises a pair of members for mounting co-axially on the power-driven shaft of the mower, one of the members having a cylindrical portion secured to a disc portion of a greater diameter and the other member having a disc portion with an upstanding peripheral wall portion of a diameter greater than that of the cylindrical portion such that the two members when fitted together co-axially define an annular chamber for a coiled cutting string, the cylindrical portion having connecting means to fix the end of a cutting string thereto and the peripheral wall portion having a guide port for the free end portion of the cutting string, the connecting means having a hollow portion formed in the cylindrical portion and a slot therein in which the end of a cuting string is wedged, the cutting string made of a high-polymer synthetic material having a diameter greater than 0.10 inches (2.5 mm), and there being means coupling the two members together for simultaneous rotation releasable to allow relative rotation by axial separation of the two members and resilient biassing means urging the two members together to the coupled disposition.

Preferably, the cutting string has such diameter of from 0.11 inches (2.8 mm) to 0.13 inches (3.5 1 mm) that is strong and flexible to the extent that it is sufficient to cut heavy wild vegetation but substantially incapable of causing damage or injury if it contacts persond or animals.

A preferred embodiment of the invention has connecting means provided with a hollow window formed in the inwardly thick wall of the cylindrical portion and a thin plate inserted in the window. The thin plate is formed with a triangular slot with an angular apex directed towards the direction of winding of the string. The inwardly thick wall has on the side pointed by the apex an outer bevelled surface and in the opposite side an inner guide plate projecting inwardly towards the apex.

In a preferred emboldiment of the invention, the two members are mounted on a shaft which is itself attachable co-axially on the output shaft of the mowing machine, the shaft being drivingly connected to the one member. So that drive may be imparted to the one member, the shaft advantageously has a polygonal section which is received in a correspondingly-shaped recess in the one member. A spring is mounted on the shaft between the other member and a washer releasably mounted on the end portion of the shaft remote from the one member, so as to bias the other member towards the one member. For this arrangement, when the washer is dismounted from the shaft, the other member as well as the one member if required, may easily be removed from the shaft, allowing replacement of a string and the coiling of the string around the cylindrical portion.

A preferable form of coupling means comprises a plurality of equi-spaced projections upstanding axially from the peripheral wall portion of the other member and receivable in corresponding recesses formed in the one member. The other member may have a circular central aperture fitting on a corresponding section of the shaft. The other member is depressible from the one member against the bias so as to be rotatable with respect to the one member. Accordingly, additional string may be payed out by rotating the one member relative to the other member so as to alter the effective working length of the string.

The apparatus of the invention contains neither spools separated from a rotary casing nor locking means therefor to be operated, and therefore is simple in construction and easy in use. The rotary assembly has a large inside space devoted to line-storage and so a long cutting line relative to its size can be stored.

The invention itself, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
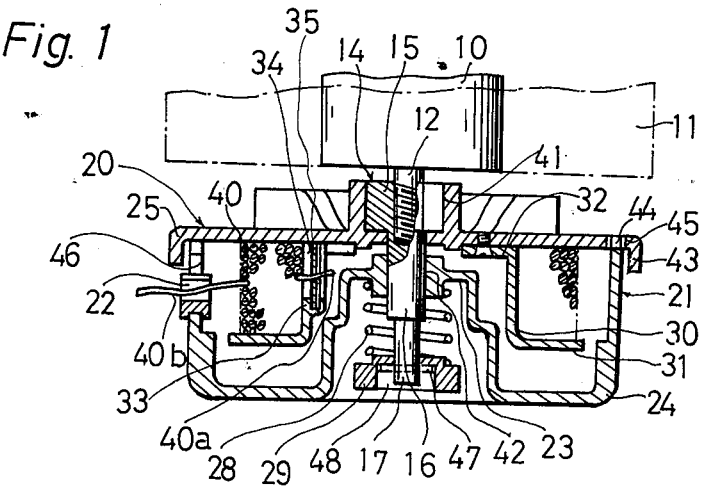
FIG. 1 is an axial sectional view of the mowing apparatus of the present invention, showing a rotary cutter assembly and a cutting string wound therein.

Referring to FIG. 1, there is shown a cutter assembly for a portable mower which may include a prime mover in the form of a gasoline engine, the rotational output of which is transmitted to the cutter assembly via a rotary drive shaft inside a tube (not shown) and gear box within a head housing 10. Alternatively, the mower may have an electric motor as a prime mover, in which case the motor would be contained in a somewhat enlarged head housing 11, as shown by broken lines in FIG. 1. The output shaft 12 of the gearbox or electric motor has a screwed portion arranged for threading engagement with a stepped shaft 14. The stepped shaft is composed of a head portion 15 of polygonal, and preferably hexagonal, cross section, an intermediate portion 16 of circular cross-section, and an end portion 17 of a smaller circular cross-section. The cutter assembly includes a top casing 20 in the form of a spool and a bottom cover 21 in the form of a cap coupled with each other. The top casing and bottom cover are preferably made of a high polymer synthetic material. The hexagonal head portion 15 is arranged to fit closely in a corresponding recess 41 formed centrally in the top casing 20. Thus, the top casing 20 is detachably mounted on the shaft 14 for rotation therewith.

The top casing 20 consists of a disc portion 25 and a cylindrical portion 30. The cylindrical portion has an outer lower flange 31 and inner upper flange 32 secured to the underside of the disc portion 25. The disc portion is in diameter larger than the lower flange 31 and its periphery is formed with annular rim 43. The bottom cover 21 has a central, inwardly-recessed bottom portion 23 with a central bore 42 and a peripheral wall portion 24 for coupling with the annular rim 43. The bottom cover 21 is provided on the top surface of peripheral wall portion 24 with a plurality of peripherally equi-distantly disposed upstanding projections 44 for fitting engagement with respective bores 45 formed in the disc portion 25 of the top casing 20. A cutting string 40, made of a high polymer synthetic material such as nylon filament, is coiled about the cylindrical portion 30 to fill an empty annular chamber defined by the disc portion 25, cylindrical portion 30 and lower flange 31. There is a hollow portion provided with a window 34 formed in the inwardly-thick wall 33 of the cylindrical portion 30 and a thin plate 35 inserted in the window.

Figure 2:
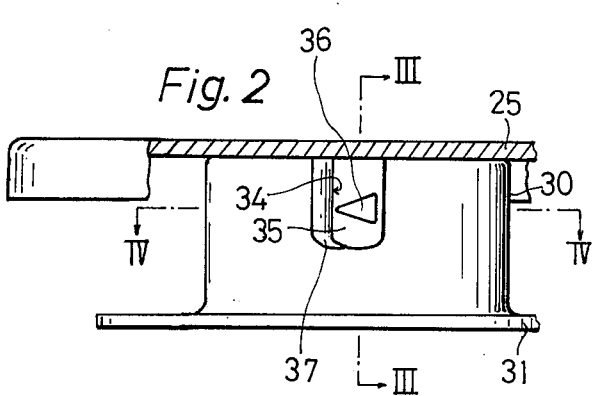
FIG. 2 is a somewhat enlarged, partly cut-away elevational view of top member in the form of a spool of the rotary assembly shown in FIG. 1.
Figure 3:
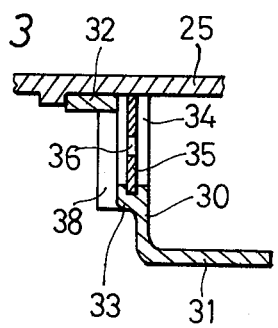
FIGS. 3 and 4 are sectional views taken respectively along III—III and IV—IV lines in FIG. 2, showing a slot to which one end of the cutting string is connected.
Figure 4:
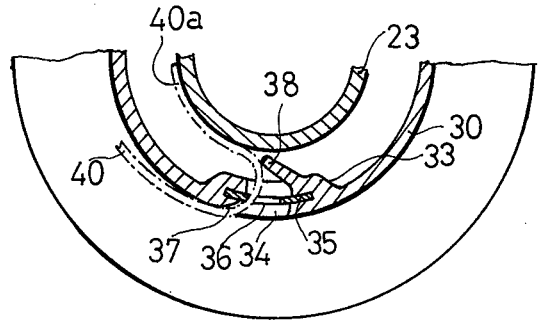

As illustrated most clearly in FIGS. 2 to 4, the thin plate 35 has a slot 36 in the form of a triangle with an acute apex pointing in the peripheral direction. The thick wall 33 has on the side pointed by the apex an outer bevelled surface 37 and on the opposite side a guide plate 38 projecting inwardly behind the apex. The string 40 has its end portion 40a tightly wedged in the slot 36 and is wound in the direction pointed by the apex.

As shown in FIG. 1, the peripheral wall 24 of the bottom cover 21 is formed with one or more open slit 46 into the lower portion of which is inserted a guide port 22 having an open top. The openings in the slit and guide port 22 are as wide as the thickness of string, so that the free end 40b of the string 40 may easily enter thereinto and, once entered, is well-located therein. The stepped shaft 14 has its end portion 17 provided with a diametrically projecting pin 47. The length of the pin is smaller than the diameter of the center bores in the top casing 20 and the bottom cover 21. A washer 29, detachably mounted on the end portion 17, is formed in its underside with a groove 48 adaped for fitting engagement with the pin 47. A coil spring 28 mounted on the end portion 17 is interposed between washer 29 and the recessed bottom 23 of the bottom cover 21. The coil spring is arranged to be so compressed as to force the bottom cover 21 against the top casing 20 when the pin 47 is set in groove 48. On the other hand, when the pin is disengaged, the washer 29 is removable from the end portion 17 and therefore the coil spring 28, the bottom cover 21 and the top casing 20 may be removed from the stepped shaft 14, in turn.

The manner of operation of the above-mentioned cutter assembly will now be explained. The top casing 20 as well as the bottom cover 21 are removed from the stepped shaft 14 by a single operation of depressing the washer 29 against the coil spring 28 to put the pin 47 off. One end portion 40a of string is passed through the slot 36 and turned along the guide plate 38. Then, the string 40, as pulled in the peripheral direction of an arrow of FIG. 4, is fixed by wedging the end portion 40a into the apex of the slot 36. Even if it is thick and strong, it can be easily turned at and certainly wedged into the apex of the slot 36. Without the guide plate 38, a thick string having a diameter greater than 0.100 inches (2.5 mm) will not turn at the slot 36. Thick and strong strings with a diameter greater than 0.10 inches (2.5 mm) make a bent with a somewhat large radius. The inward hollow space along the bevelled surface 37 can receive such large bent to prevent it from disturbing the orderly winding of string about the cylindrical portion 30.

The string 40 is directly wound about the cylindrical portion 30 of the top casing 20 until the diameter of the coiled string is almost the same as the lower flange 31. Thereafter, the top casing followed by the bottom cover 21 are mounted on the stepped shaft 14 with the projections 44 fitting in the respective bores 45 while passing the uncoiled end portion 40b of the string into the guide port 22 through the slit 46. The uncoiled end portion 40b forms the cutting flail which extends outwardly by an appropriate length, for example, one hundred times the thickness of the string. Finally, the coil spring 28 and the washer 29 are again mounted on the end portion 17 of the stepped shaft 14, and the pin 47 is set in the groove 48. The cutter assembly is now ready for rotation.

Upon actuation of the prime mover, the cutter assembly is rotated at the desired rotational speed, whereby the cutting flail extends generally radially outwardly in a substantially rigid manner from the bottom cover 21, whereby mowing or the like may be accomplished safely and efficiently. For use with a high-polymer synthetic string of a diameter of 0.11 inches (2.8 mm) to 0.13 inches (3.5 mm), it is preferable to rotate at terminal peripheral speeds of 100 m/sec to 150 m/sec for cutting wild weeds in the forest.

As the cutting flail 40b of string 40 is begins to wear away and become shortened through use, its length can easily be restored to its original, proper length. After terminating rotation of cutter assembly, the bottom cover 21 is depressed against the coil spring 28 to the extent that the bottom cover has its projections 44 released from locking engagement with the bores 45 in the top casing 20, and then the bottom cover 21 is rotated in the direction opposed to the winding of string so as to unwind the string 40 to the extent desired. Thereafter, the projections 44 of the bottom cover 21 are fitted in the respective adjacent bores 45 again.

It will be understood that the assembly of the present invention is both simple in construction and easy to use because neither separate spools nor screws requiring operation are provided. The assembly has almost all its internal space devoted to the storage of the cutting string, so a relatively long cutting string can be stored, and therefore replacement of the string is necessary only after a long period of use. The inventive assembly equipped with a thick and strong string of a high-polymer synthetic material is expected to take the place of a metal cutter assembly in the agricultural and forestal field.

What is claimed is:

1. A cutter assembly for a mowing machine having a power-driven shaft, which assembly comprises a pair of members for mounting coaxially on the power-driven shaft on the mower, one of the members having a cylindrical portion secured to a disc portion of a greater diameter and the other member having a disc portion with an upstanding peripheral wall portion of a diameter greater than that of the cylindrical portion such that the two members when fitted together coaxially define an annular chamber for a coiled cutting string, the cylindrical portion having connecting means to connect the end of a cutting string thereto and the peripheral wall portion having a guide port through which the free end portion of the cutting string passes outwardly to form a cutting flail, the connecting means having a slot formed in a radially, inwardly recessed portion of the cylindrical portion, said radially inwardly recessed portion having a partially thick wall portion formed with a hollow window in which a thin plate is inserted, the thin plate being formed with the slot with an acute apex towards the peripheral direction, the thick wall portion having on the side pointed by the apex an outer bevelled surface and on the other side an inner guide plate projecting behind the slot so as both to prevent the bent of the end portion of the string from bulging out of the recessed portion and to guide the end portion of the string to turn behind the slot, means coupling the two members together for simultaneous rotation releasable to allow relative rotation by axial separation of the two members and resilient biassing means urging the two members together to the coupled disposition.

2. A cutter assembly as claimed in claim 1, wherein the cutting string made of a high-polymer synthetic material has a diameter greater than 0.10 inches.

3. A cutter assembly as claimed in claim 2, wherein the cutting string has a diameter of from 0.11 inches to 0.13 inches.

4. A cutter assembly as claimed in claim 1, wherein the two members are mounted on a shaft which is itself attachable coaxially on the output shaft of the mowing machine, the shaft being drivingly connected to the one member.

5. A cutter assembly as claimed in claim 4, wherein the shaft has a polygonal section which is received in a correspondingly-shaped recess in the one member to impart drive thereto.

6. A cutter assembly as claimed in claim 5, wherein a spring is mounted on the shaft between the other member and an abutment releasably mounted on the end portion of the shaft remote from the one member, so as to bias the other member towards the one member.

7. A cutter assembly as claimed in claim 6, wherein the coupling means comprises a plurality of equispaced projections upstanding axially from the peripheral wall portion of the other member and receivable in corresponding recesses or apertures formed in the one member, the other member having a circular central aperture fitting on a corresponding section of the shaft.

8. A cutter assembly as claimed in claim 7, wherein the guide port is defined by a guide element let into a slot formed in the peripheral wall element, the guide element having a partcircular aperture open axially to allow fitting of a cutting string.

* * * * *